Nov. 22, 1966 J. B. DAMREL, JR., ETAL 3,286,529
PRECISION PRESSURE GAUGE
Original Filed March 28, 1963 4 Sheets-Sheet 1

United States Patent Office 3,286,529
Patented Nov. 22, 1966

3,286,529
PRECISION PRESSURE GAUGE
John B. Damrel, Jr., and Jerry L. Fruit, Houston, Tex., assignors to Texas Instruments Incorporated, Dallas, Tex., a corporation of Delaware
Continuation of application Ser. No. 268,780, Mar. 28, 1963. This application Dec. 13, 1965, Ser. No. 513,468
25 Claims. (Cl. 73—418)

This is a continuation of application Ser. No. 268,780, filed Mar. 28, 1963, now abandoned. This invention relates to a precision pressure gauge for use either in measurement or control of pressure or any other parameter which can be converted to pressure. In a more specific aspect, the invention relates to a fused quartz precision gauge system.

Measurement of pressure of physical conditions which can be converted to pressure or can be made pressure-dependent has been accomplished through a variety of instrumentalities. Bourdon tubes which are responsive to pressure differentials across the walls thereof undergo deformation. In systems of this type metallic tubes are subject to hysteresis effects and, in general, are temperature dependent so that they are subject to error. Complex systems are necessary to compensate or eliminate such errors. Measurements are often made by applying a restoring force to null or balance the forces in the system. However, there has been lacking a versatile system which can be adapted to various ranges of pressures and yet be free of the undesirable characteristics of the prior art systems.

It is an object of the present invention to provide a new and highly useful precision pressure gauge.

It is a further object of the present invention to provide a precision pressure gauge which may accommodate any one of a number of different pressure ranges.

A further object of the invention is to provide a precision pressure gauge in which a transducer system tracks a pressure-induced deflection of a pressure-sensitive element without introducing any mechanical forces to the moving pressure-dependent system.

In accordance with the present invention, the pressure gauge includes a helical pressure tube fixedly supported at one end thereof. A mirror is mounted at the axis of the tube for rotation in response to variations in the pressure differential across the walls thereof. Means including a light source directs a beam of light onto the mirror. A detector means mounted with the light source is provided for detecting the beam after reflection from the mirror. A rotatable support is provided for the light source and detector, permitting rotation about the axis of the tube. A drive connection is then provided leading to the rotating system, optimizing reception of the beam of light by the detector means.

In a preferred embodiment the tube is a fused quartz pressure spring having symmetry about the axis of rotation of the sensing system. Further and preferably, the sensing system includes nulling means for sensing the position of the movable end of the pressure spring.

In a more specific aspect there is provided a hollow fused quartz helical spring having a fixed support for one end thereof and a mirror mounted at the axis thereof at a second point spaced from the fixed end. A support is provided for rotation about the axis of the spring with a pair of matched light sensitive devices mounted on the support together with the light source for directing a beam of light onto the mirror and thence to the light sensitive devices. Means are provided for rotating the support so as to receive the beam of light by the light sensitive devices. A utilization means is connected to the light sensitive devices and is responsive to equal distribution of the beam between the devices.

Further, in accordance with the invention, there is provided a pressure sensing capsule in which a hollow fused quartz helical spring is mounted in a gastight container and is fixed at one end by means of a flow connection to a first gas input fitting. The other end of the spring is closed and is connected to a mirror rotatably mounted at the axis of the spring. The pressure-tight container encompasses the spring. The container is provided with a second gas input fitting to permit control of the atmosphere outside the spring while applying it to the inside of the spring pressures to be measured, monitored or controlled. The container is at least in part transparent for transmission of a light beam to and from the mirror for tracking rotational position of the mirror.

For a more complete understanding of the present invention and for further objects and advantages thereof, reference may now be had to the following description taken in conjunction with the accompanying drawings in which.

In a preferred embodiment of the invention, a fused quartz pressure spring is employed. Fused quartz is more nearly an ideal pressure spring material than any metal. It is one of the most perfectly elastic materials known. Thus, pressure springs made of such material have no hysteresis, creep, or relaxation commonly associated with gauges of the prior art. Fused quartz has an extremely low coefficient of thermal expansion which makes temperature effects extremely small. Use of such material in accordance with the present invention makes possible highly accurate pressure measurements under adverse environmental conditions.

In order to take advantage of the lack of hysteresis in a fused quartz system, the deflection of a pressure-sensitive spring is read optically so that no frictional or reactive forces are imposed on the pressure-sensitive element.

Figure 1:
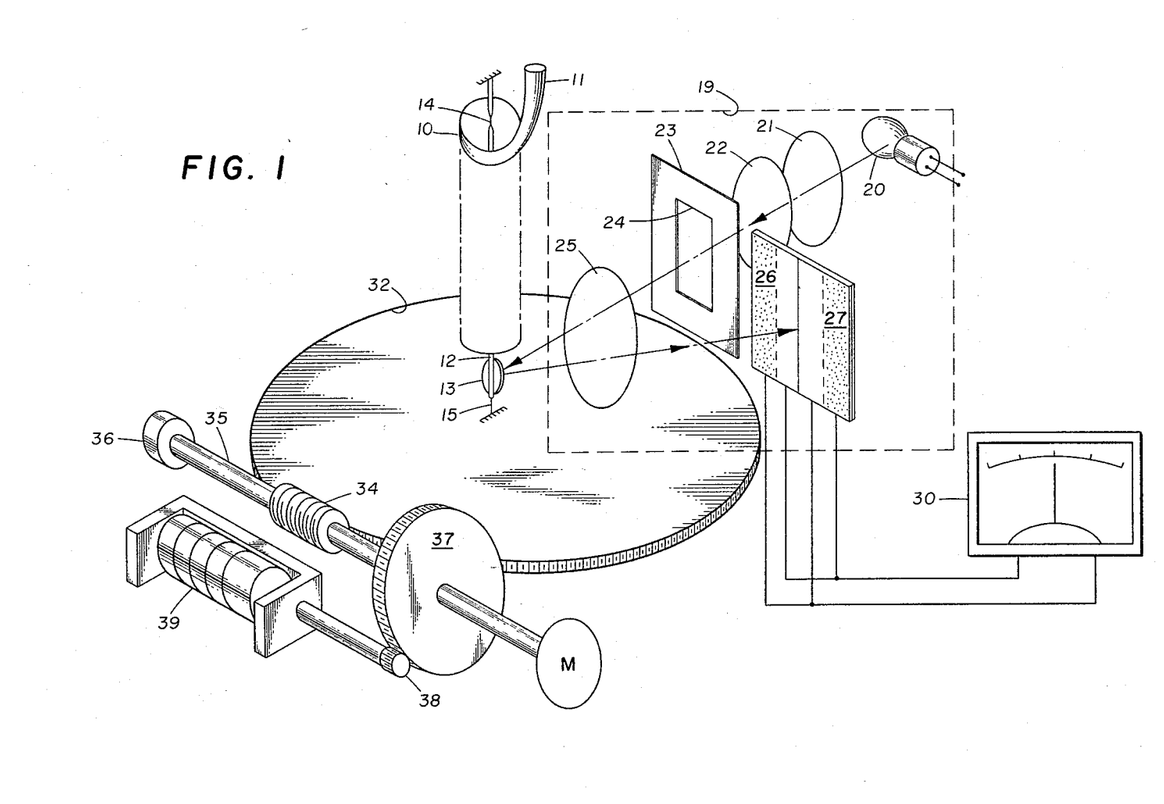
FIGURE 1 is a functional diagram including elements embodied in the present invention.

The invention is shown diagrammatically in FIGURE 1, where a spiral-shaped, thin-walled fused quartz spring 10 is anchored at the upper end 11. The spring 10 is a hollow tube. The upper end 11 is to be flow-connected by a suitable pressure fitting, through the wall of a case or housing, omitted from FIGURE 1. The lower end of the spring 10 is closed and is fastened to a central stabilizing rod 12. A mirror 13 is mounted on rod 12. Rod 12 is anchored by way of an upper hinge 14 and a lower hinge 15. Rod 12, also made of fused quartz, has hinges 14 and 15 formed therein while under tension by application of localized heat to draw the rod down to a filament of reduced diameter which permits rotation of the portion of rod 12 between hinges 14 and 15. When spring 10 is mounted in this manner, variations in the pressure differential across the walls of the spring 10 will cause the mirror 13 to rotate.

The deflection of the mirror preferably is read optically through use of a transducer 19. The transducer 19 includes a light source 20, a condensing lens unit including the lenses 21 and 22, and a baffle 23 having an aperture 24 therein. Light emanating from the aperture 24 passes through an objective lens 25 to the mirror 13 and back to the objective lens which focuses the image of the aperture 24 onto two light sensitive cells 26 and 27. The cells 26 and 27 preferably are photovoltaic silicon cells which are matched for sensitivity and temperature characteristics. They are connected together in series aiding relationship and to a null indicator 30. The null indicator may be a microammeter selected as to have a sensitivity consistent with the outputs of lamp 20 and the cells 26 and 27.

The transducer 19 is mounted on the upper face of a large worm gear or disc 32. The disc 32 is mounted for rotation about the axis of spring 10. The position of the transducer 19 may be varied relative to the mirror 13 by actuation of a worm gear 34 which engages teeth on the periphery of the disc 32.

The worm 34 is mounted on a shaft 35 which has a control knob 36 at one end thereof for adjustment of the position of the transducer 19. A gear train including a gear 37 and a pinion 38 are employed for driving a counter 39.

In operation, the end 11 of the spring 10 may be connected to a source the pressure of which is to be measured or controlled. Lamp 20 is then energized. If the areas of the image of the aperture 24 as focused onto cells 26 and 27 are equally divided between the cells 26 and 27, the output signal is zero as applied to the indicator 30 and the system is nulled. However, when the aperture image is displaced, due to pressure changes within the element 10 or manual rotation of the transducer, the transducer system may become unbalanced by reason of the difference in areas on cells 26 and 27 which are illuminated. The magnitude of the unbalance may be indicated by the null detector 30.

Detector 30, in the form of a microammeter, may be suitably calibrated to provide a direct indication of the pressure differential across the walls of the tube 10. When a pressure change takes place, the light on the cells 26 and 27 is displaced. The extent of rotation of the disc 32 necessary to null the transducer 19 is a function of the pressure change and a constant which is specific to each spring. With a fused quartz element for the spring 10, the signal is linear over relatively low angles, of the order of plus or minus 1½ degrees, without nulling.

It is to be noted that the spring 10 is not restored to its zero position for measurement. The system is not a force balance system. All hysteresis, friction and reaction forces on the pressure spring 10 which ordinarily would result in error are eliminated. Further, by reason of the nature of the spring 10, no corrections are necessary for tilt gravity or temperature under normal conditions.

Figures 2, 3, 4:
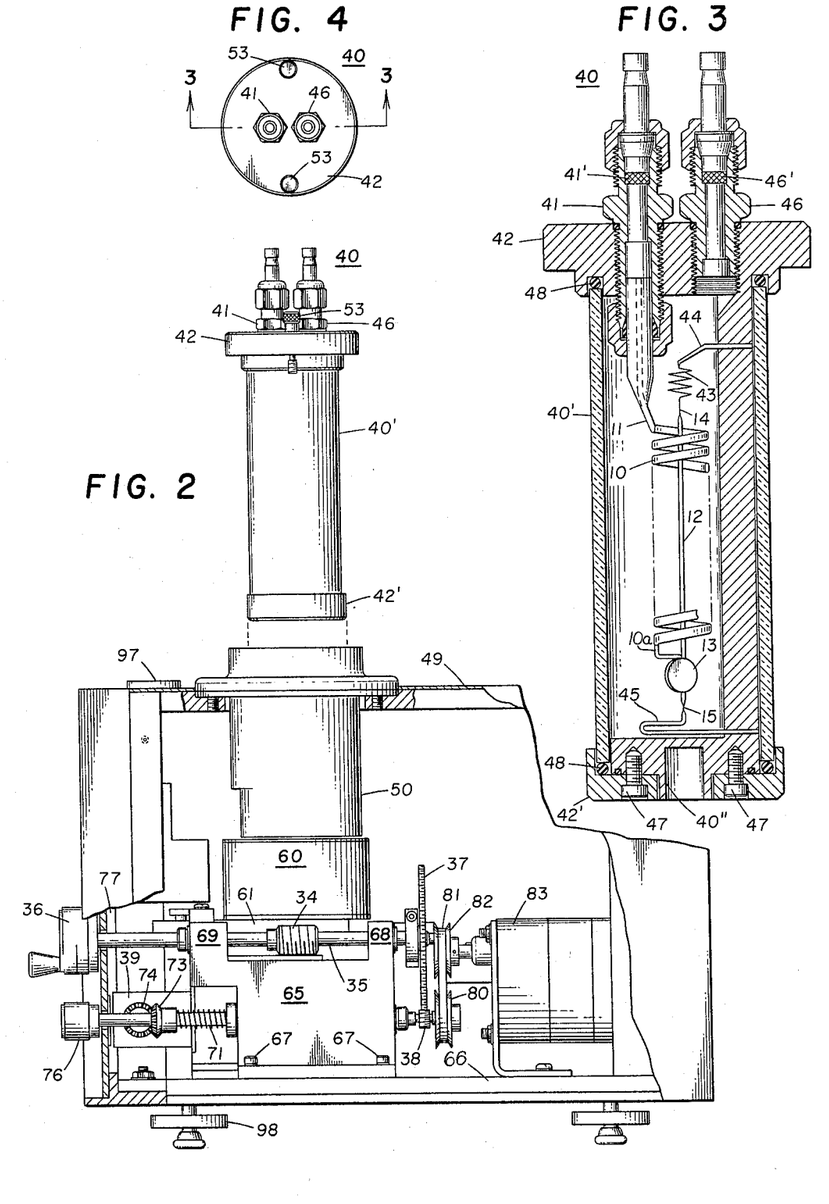
FIGURE 2 is an exploded side view of a fused quartz pressure capsule and meter, partially broken away.
FIGURE 3 is an enlarged sectional view of the capsule of FIGURE 2 taken along line 3—3 of FIGURE 4.
FIGURE 4 is a top view of the capsule.

FIGURES 2 and 3 illustrate in more detail one embodiment of a fused quartz pressure measuring system. FIGURES 2 and 3 show a spring capsule 40 as viewed from one side. The spring 10 is a hollow quartz filament wound in helical form and supported at the upper end by a quartz capillary tube 11 fused to spring 10. A fitting 41 supports capillary 11 and provides a flow channel leading through a tube mount 42. The vibration stabilizing rod 12 is connected by hinge 14 to a shock absorbing spring 43 which is connected at its upper end to a support rod 44. Rod 44 is secured to the spring mount 42. The spring mount 42 may be formed of aluminum or such material. The lower end of the rod 12 supports the mirror 13 and is connected by way of hinge 15 to a U-shaped support rod 45. The lower end 10a of the spring 10 is closed and is secured to the rod 12. As the end of the spring 10 rotates in response to pressure variations, the rod 12 will rotate.

The capsule 40 includes a cylindrical clear glass tube 40' which is maintained in a sealed relationship between the header upper end of mount 42 and a lower cap 42' by screws 47. Suitable O-rings 48 are provided between the ends of the tube 40' and the mount 42, 42' to maintain the capsule pressure tight. A second fitting 46 provides a flow channel through the mount 42 to the zone inside the tube 40' exterior of the spring 10. Fittings 41 and 46 contain sintered stainless steel filters 41' and 46', respectively, which are removable for replacement. As best seen in FIGURE 3, the lower end of the holder 40 extends through the cap 42' and is provided with a central recess 40" which is axially aligned with the spring 10 and the vibration stabilizing rod 12. By this means the recess 40" may receive an end of the supporting axle or shaft for the worm gear 32, FIGURE 1, so that the pressure spring 10 will be maintained at the axis of rotation of the transducer 19.

In FIGURE 2 the capsule 40 is shown positioned for insertion into an instrument housing 49. The lower end is adjacent a capsule socket 50. The upper end of socket 50 is flared to rest upon the upper surface of housing 49. The upper end of socket 50 is annular to provide a landing for the down facing shoulder of the spring mount 42. The cap 42' is sized to enter an opening 51 in the socket 50. The socket 50 is secured to housing 49 by screws 52. The capsule may be secured in socket 50 by two captive screws 53 engaging holes 54 in the upper end of socket 50.

As best seen in FIGURE 2 the socket 50 extends downward into the housing 49, terminating immediately above the upper end of a transducer cylinder 60. The cylinder 60 is supported on a spacer 61 which in turn is supported by the worm gear 32. The worm gear 32 is located immediately behind the shaft 35 on which the worm 34 is mounted. The shaft 35 is supported by a bracket 65 which in turn is mounted on a base plate 66 of the housing 49. Screws 67 secure bracket 65 in a fixed position. The bracket 65 has a pair of extensions 68 and 69 which receive bearings for the support of shaft 35. The shaft 35 is locked in the bearing extensions 68 and 69 as to prevent axial movement thereof. The shaft 35 includes a knob 36 on the left end thereof as viewed in FIGURE 2. The right hand end of the shaft supports a gear 37 which meshes with the pinion gear 38. Gear 38 is mounted on a shaft 71 which is journaled in the block 65. A bevel gear 73 on shaft 71 is positioned in driving relation with respect to a second bevel gear 74 which is on the shaft driving the counter 39. A second control knob 76 is mounted on the end of the shaft 71 and is adjacent to the knob 36. The shafts 35 and 71 extend through the front cover plate 77 of the instrument housing 49.

A pulley 80 is mounted on the shaft 71 at the end thereof opposite the knob 76. The pulley 80 is coupled by a belt 81 to a second pulley 82 which is driven by a motor 83. With the structure thus provided the disc 32 may be rotated (1) by the knob 36 for coarse positioning, (2) by knob 76 for fine positioning, or (3) by energization of the motor 83 as will hereinafter be explained.

Figures 5, 9, 11:
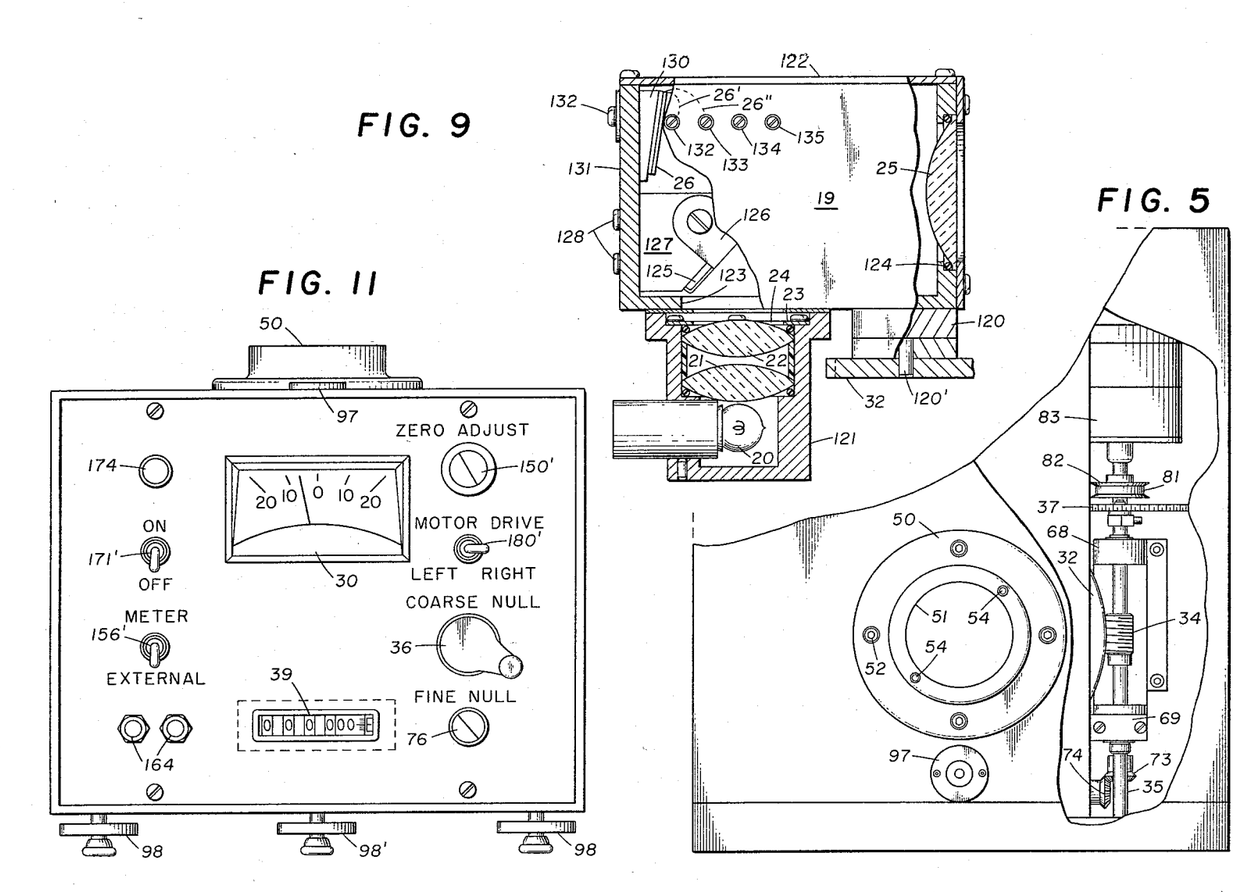
FIGURE 5 is a top view of the instrument of FIGURE 4 with the pressure capsule removed and the cover partially broken away.
FIGURE 9 is an enlarged side view of the transducer 19 partially broken away and in section.
FIGURE 11 is a front view of a pressure instrument embodying the present invention.
Figure 6:
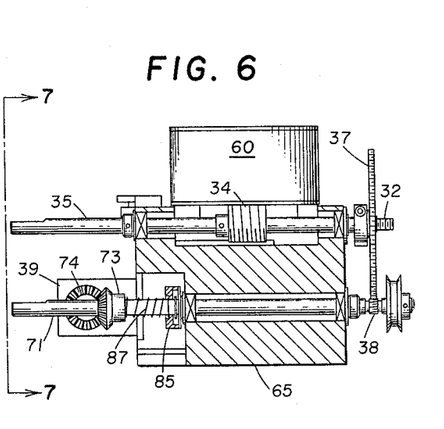
FIGURE 6 is a sectional view taken along line 6—6 of FIGURE 7.

The relationship between the worm gear 34 and disc 32 is more readily seen in FIGURE 5. The block 65 has been shown in sectional view in FIGURE 6. The disc 32 is shown extending beyond the end of shaft 35. The shaft 71 is shown with an intermediate coupling 85 and a spring 87 which biases the bevel gear 73 towards the front of the instrument. The spring 87 serves to maintain the bevel gear 73 in mesh with the bevel gear 74. However, the gears 73 and 74 may be disengaged by pushing inward on the shaft 71 to oppose the spring 87. This permits setting of the counter 39 to zero for any given position of the disc 32.

Figure 7:
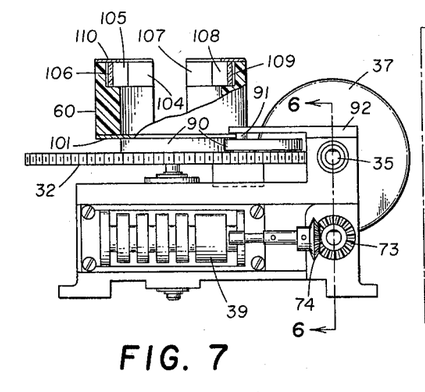
FIGURE 7 is a view of the transducer driver system of FIGURE 6 as viewed from line 7—7 of FIGURE 6.
Figure 8:
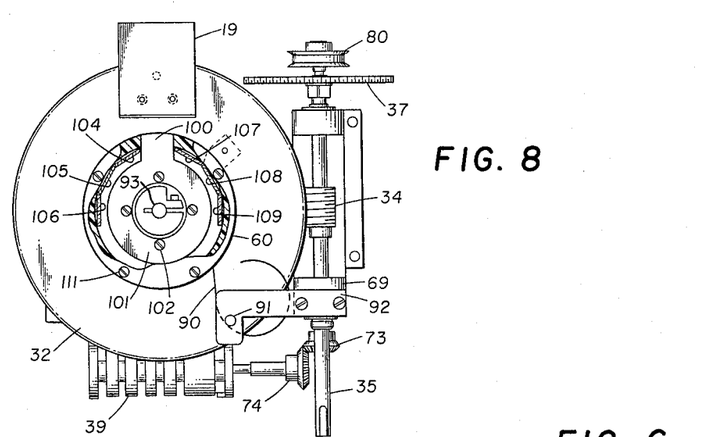
FIGURE 8 is a top view of the transducer drive system shown partially broken away.

FIGURE 7 shows the mechanism of FIGURE 6 as viewed from the line 7—7 of FIGURE 2. As best seen in FIGURE 7 a coil spring 90 is wrapped around spacer 60. The free end of spring 90 is looped around a pin 91 extending downward toward the disc 32 from a bracket 92. Bracket 92 is secured to the upper surface of the extension 69. The spring 90 is secured at its opposite end to the shaft 93 on which the disc 32 is mounted. The spring 90 is coiled about the spacer 60 to maintain the disc 32 biased resiliently in a clockwise direction. Any play between the worm gear 32 and the worm 34 is thus eliminated. The transducer 19 of FIGURE 1 is shown in FIGURE 8 as mounted on the worm gear 32. The front of the transducer 19 faces a slot 100 in the cylinder 60. The cylinder 60 is shown partially in section in FIGURES 7 and 8 to illustrate the housing therein of a plurality of light-sensitive devices on both sides of the slot 100. More particularly, the cylinder 60 is mounted on a base plate 101 which is secured by means of screws 102 to the hub 60 on the shaft 93. The upper portion of the cylinder 60 is of enlarged diameter. A plurality of light-sensitive devices are mounted in the recess thus formed. Photo cells 104, 105 and 106 are positioned on the left hand side of the aperture 100. Similar photo cells 107, 108 and 109 are positioned at the right hand side of the slot 100. The photo cells 104–109 are mounted symmetrically with respect to the axis of shaft 93 and face inwardly. They are positioned to receive light from the mirror 13 when the capsule 40 is inserted into the socket 50. A slotted ring 110 is secured to the upper surface of the cylinder 60 as by screws 111.

The transducer 19 is shown on an enlarged scale as viewed in FIGURE 9. Transducer 19 includes a supporting bracket 120 and pin 120' which extends through worm gear 32 about which transducer 19 rotates allowing horizontal optical alignment with mirror 13. Screws (not shown) through bracket 120 fasten transducer 19 to worm gear 32 after alignment. Transducer 19 includes a light source 20 which is mounted in a housing 121 which is secured to the bottom of the upper detector housing 131. The bulb 20 is mounted near the lower end of the housing 121. The condensing lenses 21 and 22 are mounted immediately above the lamp 20 and are spaced apart by a spacer (not shown) and held in by a baffle 23 which serves as a retaining ring. Aperture 24 is aligned with an aperture 123 in the bottom plate of housing 131. A mounting bracket 126 supports a mirror 125. Bracket 126 is pivotally mounted on an angle bracket 127 which is fastened to housing 131 by screws 128. Light from bulb 20, passing through lenses 21 and 22 and aperture 24, strikes the mirror 125 and is directed outward through objective lens 25. Lens 25 is mounted in an aperture in the face of detector 19 with an O-ring 124 being provided to cushion lens 25 to prevent shipping when fastened in by the plate screwed to the transducer front. Vertical optical alignment is obtained by moving bulb 20 in or out of housing 121. This and the horizontal adjustment enable the positioning of an image of the filament of bulb 20 on the mirror 13. When the mirror 13 faces the lens 25, an image of aperture 24 is projected through the objective lens 25 and is focused on photo cells 26 and 27, arranged as shown in FIGURE 1. Only the cell 26 is shown in FIGURE 9, cell 27 being hidden by cell 26 in said figure. Both cells 26 and 27 are mounted on an angle bracket 130 which is secured to the rear wall 131 of the housing 122 by means such as screw 132. The unit formed by housings 121 and 122 is light-tight except for the path through the lens 25.

Electrical leads 26' and 26" extend from the photo cell 26 to the terminals 132 and 133, respectively. The latter terminals are mounted in an insulated manner on the side of the housing 122. In similar manner leads from the photo cell 27 are connected to terminals 134 and 135.

Figure 10:
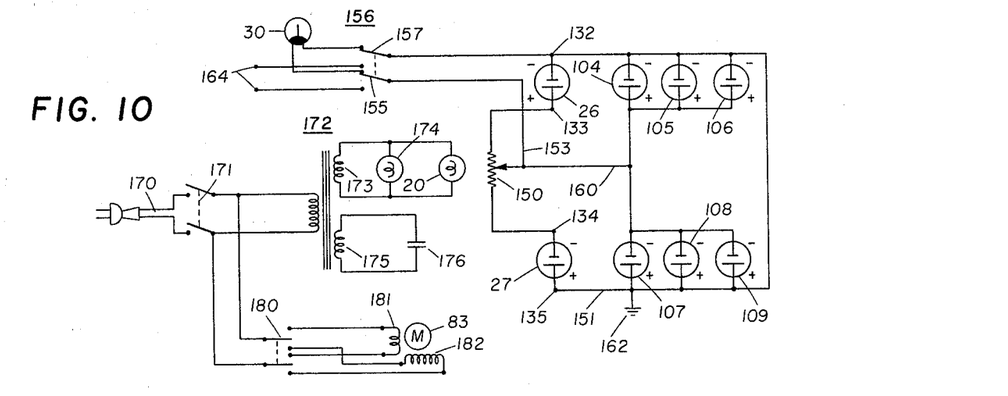
FIGURE 10 is a schematic circuit diagram for the meter.

The photo cells 26 and 27 are to be connected by way of terminals 132–135 to a sensing circuit of FIGURE 10. In FIGURE 10 the balanced photo cells 26 and 27 are interconnected in series aiding relation by a potentiometer 150. The positive terminal of cell 27 is connected to a bus 151. The photo cells 26 and 104–106 are connected at their negative terminals to the bus 151. Similarly, the photo cells 107–109 are connected at their positive terminals to the bus 151.

The variable tap on potentiometer 150 is connected by way of conductor 153 to the arm 155 of a double-pole, double-throw switch 156. The tap on potentiometer 150 is also connected by way of conductor 160 to the positive terminals of each of the cells 104–106 and to the negative terminal of each of the cells 107–109. The bus 151 is connected to a ground connection 162 and to the second arm 157 of the switch 156. The upper terminals of switch 156 are connected to the meter 30. The lower terminals of the switch 156 are connected to a pair of external jacks 164. In one embodiment the light-sensitive cells 26 and 27 produce at least 5 microamperes deflection on meter 30 for each tenth of a revolution of the knob 76 on shaft 71. The lamp 20 is energized from a suitable power circuit 170 which is connected by way of a double-pole, single-throw switch 171 to a constant voltage transformer 172. The secondary winding 173 of the transformer 172 is connected to the lamp 20 and also to an indicator lamp 174. A secondary winding 175 of the transformer 172 is connected to a condenser 176.

The motor 83 is energized from the source circuit 170 by way of switch 171. A directional control switch 180 is provided. In its upper position of the switch the first winding 181 on motor 83 is excited. In the lower position, the winding 182 is energized. Thus, the direction in which the motor 83 rotates is controlled by switch 180.

With switch 156 in the upper position, the meter 30 of FIGURE 1 is employed as a nulling means. In the lower position an external circuit is employed so that the system may be included in a feedback loop. In the latter case, an error or unbalance signal may be employed to drive a servo-amplifier, which in turn may drive motor 83.

The control elements for the circuit and the sensing system are mounted on the face of the gauge was viewed in FIGURE 11.

The meter 30, the counter 39, the knobs 36 and 76, the external terminals 164 and the pilot light 174 are shown as they appear on the face of the unit. Levers 156', 171' and 180' serve to permit selective actuation of the switches 156, 171 and 180, respectively. The zero adjustment control 150' permits adjustment of the variable tap on the potentiometer 150.

The cells 104–109, mounted in the cylinder 60, permit sensing the direction of rotation required to bring the light beam from mirror 13 into registration with the cells 26 and 27. The circuit of FIGURE 10 provides for both search and nulling operations. Preferably the system is operated with the case level as indicated by the level bubble unit 97 mounted on the top of the housing 49. Adjustable feet 98 are provided for leveling purposes.

In one embodiment of the invention the cells 26 and 27 were high efficiency solar cells of the type manufactured and sold by Hoffman Electronics Corporation, 1001 Arden Drive, El Mante, California, and identified as catalog number 120CG–11. Such units had an efficiency of 11% in conversion of light energy. The cells 104–109 were of the type available from the same source and identified as catalog number 120C–8, the cells being of lower efficiency. The cells were all of dimensions 1 cm. x 2 cm. Cells 104–109 were mounted by adhesively securing them in the cylinder 60 of an insulation material.

The meter 30 was a taut band microammeter having a resistance preferably less than 300 ohms with a 10–0–10 microampere sensitivity. It was of the type manufactured and sold by Assembly Products, Inc., Chesterland, Ohio, and identified as model 361.

The transformer 103 was of the constant voltage type such as manufactured by Solar Electric Company and identified as catalog number 31899. In order for the system to be direct reading for small deflections, it was found desirable to maintain the intensity of the beam from lamp 20 substantially constant. Constant voltage excitation of the lamp 20 prevents zero shift when the line voltage fluctuates. Any mismatch between the cells 26 and 27 would cause a zero shift if the light intensity were permitted to vary. Thus, by controlling the intensity as well as providing a substantial match between the cells 26 and 27, the possibility of error is substantially reduced.

In some embodiments of the invention the magnitude of the deflection of the spring 10 is presented digitally rather than on the mechanical counter 39. In each case the deflection of the spring is sensed optically and transduced to an electrical signal which is sensed on the microammeter. When the system is mechanically nulled, the resultant spring deflection is presented in terms of degrees by the indicator on the counter. The repeatability is then $2 \times 10^{-3}$ degrees and the resolution is $1 \times 10^{-3}$ degrees. The signal may be sensed externally rather than by the meter as provided for by terminal 164, FIGURE 10. In this case the resolution is then limited only by the amplification of the signal by external equipment. The signal may be recorded or amplified within ±2 degrees about any preset transducer setting without manual or servo nulling. For example, preset the tube to 75,000 degrees of deflection. The deflection of 75 degrees represents a particular pressure. The signal may then be monitored from 73 to 77 degrees with each deflection corresponding to some pressure change from the initial setting without movement of the transducer 19.

Capsules have been provided in accordance with the present invention in which the spring constants thereof vary less than one part in 10,000 per degree centigrade. Several different springs may be provided with each unit made in accordance with the present invention. By this means spring capsules may be made available with different constants. A wide range of absolute or gauge pressures from zero vacuum to about 500 p.s.i. may be measured by simple substitution of capsules. By this means a constant depending on the particular element being employed may be applied to the reading of the counter 39 to give the actual pressure.

For example, springs may be provided for substitution which have standard constants of 10 mm. of mercury per degree of revolution of the mirror, 1 inch mercury per degree, 1 p.s.i. per degree and 5 p.s.i. per degree or any other constant in between. With each spring a given range of pressures may be measured to within 1 part in 100,000.

In manual operation the position of the turntable is controlled by rotation of knobs 36, 76 or the motor 83. In either manual or automatic operation the unbalanced signal may be fed directly to a suitable recording system to provide overall resolution, limited only by the amount of amplification in the recorder channel and thus is useful in modes of operation other than the indicating mode involving use of meter 30.

Having described the invention in connection with certain specific embodiments thereof, it is to be understood that further modifications may now suggest themselves to those skilled in the art and it is intended to cover such modifications as fall within the scope of the appended claims.

What is claimed is:
1. A pressure gauge which comprises:
 (a) a hollow helical tube supported with one end thereof fixed and with the other end movable,
 (b) a mirror mounted at said other end of said tube and at the axis thereof for rotation relative to said axis in dependence upon movement of said other end of said tube,
 (c) structure for establishing a pressure differential across the walls of said tube to move said other end,
 (d) a sensing system for directing a beam of light onto said mirror and including light-sensitive means for detecting the reflected light,
 (e) rotatable means for supporting said sensing system for rotation about said axis to bring into predetermined space coincidence said light-sensitive means and said reflected light, and
 (f) a circuit means responsive to said light-sensitive means for developing a distinctive physical condition upon occurrence of said space coincidence.

2. The combination set forth in claim 1 in which said light-sensitive means comprises two matched photocells and said circuit means is a nulling circuit.

3. A pressure gauge which comprises:
 (a) a hollow fused quartz helical tube supported with one end thereof fixed and with the other end movable,
 (b) a mirror mounted at said other end of said tube and at the axis thereof for rotation relative to said axis in dependence upon movement of said other end of said tube,
 (c) structure for establishing a pressure differential across the walls of said tube to move said other end,
 (d) a sensing system for directing a beam of light onto said mirror and including light-sensitive means for detecting the reflected light,
 (e) rotatable means for supporting said sensing system for rotation about said axis to bring into predetermined space coincidence said light-sensitive means and said reflected light, and
 (f) a circuit means responsive to said light-sensitive means for developing a distinctive physical condition upon occurrence of said space coincidence.

4. A pressure gauge as set forth in claim 3, wherein said light-sensitive means includes two juxtaposed solar cells having the positive terminal of one connected to the negative terminal of the other, and wherein said circuit means includes means responsive to the connected terminals and to the two terminals not connected together for producing an error signal directly proportional to a small displacement of said reflected light from said space coincidence.

5. A pressure gauge which comprises:
 (a) a hollow helical tube supported with one end thereof fixed and with the other end movable,
 (b) a mirror mounted at said other end of said tube and at the axis thereof for rotation relative to said axis in dependence upon movement of said other end of said tube,
 (c) encapsulating structure for said tube having flow channels leading into said tube and to an enclosure surrounding said tube for establishing a change in the pressure differential across the walls of said tube to move said other end, said structure including a transparent wall,
 (d) a sensing system for directing a beam of light through said wall onto said mirror and including light-sensitive means for detecting the reflected light,
 (e) rotatable means for supporting said sensing system for rotation about said axis to bring into predetermined space coincidence said light-sensitive means and said reflected light, and
 (f) a circuit means responsive to said light-sensitive means for developing a distinctive physical condition upon occurrence of said space coincidence.

6. A pressure gauge which comprises:
 (a) a hollow fused quartz helical tube supported with a first point thereof fixed and with a second point movable, (b) a mirror mounted at said second point with the face thereof parallel to the axis of said tube for rotation about said axis in dependence upon movement of said second point, (c) structure for establishing a pressure differential across the walls of said tube to move said second point relative to said first point, (d) a sensing system including means for directing a beam of light onto said mirror and light-sensitive means for detecting the reflected light, (e) rotatable means to rotate said sensing system about said axis to move said light-sensitive means into said reflected light, and (f) a means responsive to said light-sensitive means for developing a distinctive physical condition when said beam is centered on said light-sensitive means.

7. A pressure sensing system which comprises:

(a) a base, (b) a hollow helical fused quartz tube fixedly supported at one end thereof to said base and rotationally anchored at the other end, (c) means for developing changes in the pressure differential across the walls of said tube to cause rotation of said other end, (d) a mirror mounted at said other end for rotation about the axis of said tube in proportion to said rotation of said other end, (e) means including a light source for directing a beam of light toward said mirror, (f) photocell means for detecting light reflected from said mirror, (g) rotatable means supported by said base for mounting said source and said photocell means for rotation about said axis, (h) a drive connection leading to said rotatable means to control the position thereof relative to said axis, and (i) an indicating circuit connected to said photocell means for developing a distinctive physical condition when said photocell means is rotated into said light.

8. A pressure sensing system as set forth in claim 7, including rigid means fixed to said base to anchor rotationally said other end of said fused quartz tube, a pair of quartz fiber support rods extending from said rigid means toward said axis of said tube, and a quartz stem connected to the support rod adjacent said one end of said quartz tube by a quartz fiber spring and extending toward the rod adjacent to the other end, said stem being connected to said last mentioned rod by a quartz hinge, and said other end of said helical fused quartz tube being fastened to said stem.

9. The combination which comprises:

(a) a hollow fused quartz helical spring, (b) a fixed support coupled to a first point on said spring, (c) means for establishing a pressure differential between the interior and exterior of said hollow spring, (d) a mirror mounted at the axis of said spring at a second point and coupled thereto for movement proportional to relative movement between the first and second points, (e) a pair of light-sensitive devices, (f) a light source mounted in fixed relation with respect to said devices for directing a light beam onto said mirror, (g) means for rotating said devices into the reflected beam emanating from said mirror, and (h) means connected to said devices and responsive to equal distribution of said reflected beam between them to produce a distinctive physical condition.

10. The combination as set forth in claim 9, further including means to minimize fluctuation of the intensity of said light beam for preventing erroneous operation of said means to produce a distinctive physical condition.

11. The combination which comprises:

(a) a hollow fused quartz helical spring open at one end, (b) a fixed support flow-connected to said spring at the open end a support for the other end which permits rotation thereof, (c) a mirror mounted for rotation with said other end of said spring, (d) a pair of light-sensitive devices, (e) a light source mounted in fixed relation with respect to said devices for directing a light beam toward said mirror, (f) means for rotating said devices into the reflected beam emanating from said mirror, and (g) means connected to said devices and responsive to equal distribution of said reflected beam between them to produce a distinctive physical condition.

12. The combination which comprises:

(a) a hollow fused quartz helical spring open at one end, (b) a fixed support for one end of said spring and a support for the other end which permits rotation thereof, (c) means for coupling said spring to a source of pressure to be measured, (d) a mirror mounted for rotation with said other end of said spring, (e) a pair of light-sensitive devices, (f) a light source mounted in fixed relation with respect to said devices for directing a light beam toward said mirror, (g) a turntable whose axis is aligned with the axis of said spring for supporting said light source and said devices, and for rotating said devices into the beam reflected from said mirror, and (h) means connected to said devices and responsive to equal distribution of said beam between them to produce a distinct physical condition.

13. The combination which comprises:

(a) a hollow fused quartz helical spring, (b) a fixed support coupled to said first point on said spring, (c) flow connections leading to said spring for establishing pressure differentials across the walls of said spring, (d) a mirror mounted at the axis of said spring at a second point and coupled thereto for movement proportional to rotation of said spring between the first and second points, (e) a pair of light-sensitive devices, (f) a light source mounted in fixed relation with respect to said devices for directing a light beam toward said mirror, (g) means for mounting said source and said devices for rotating said devices into the beam reflected from said mirror, (h) means coupled to the mounting means for measuring the amounts of rotation thereof, and (i) means connected to said devices and responsive to equal distribution of said beam between them to produce a distinctive physical condition.

14. The combination which comprises:

(a) a hollow fused quartz helical spring, (b) a fixed support coupled to a first point on said spring, (c) flow connections leading to said spring for establishing pressure differentials across the walls of said spring, (d) a mirror mounted at the axis of said spring at a second point and coupled thereto for movement proportional to relative movement between the first and second points, (e) a pair of matched photocells,
(f) a collimated light source mounted in fixed relation with respect to said photocells for directing a light beam toward said mirror,
(g) means for mounting said source and photocells for rotating about the axis of said spring,
(h) means for measuring the amounts of rotation, and
(i) means connected to said photocells and responsive to equal distribution of said beam between them to produce a distinctive physical condition.

15. The combination as set forth in claim 14, further including
an array of auxiliary photocells mounted about said axis to receive said light beam when not received by said pair of matched photocells, and means responsive to reception of said beam by said array to produce another distinctive physical condition.

16. A pressure sensing system which comprises:
(a) a hollow helical fused quartz tube fixedly supported at one end thereof and anchored for rotation at the other end,
(b) means to connect said tube to a source of pressure to be measured to cause rotation of said other end in proportion to the pressure differential across the walls of said tube,
(c) a mirror mounted at said other end for rotation with said other end about the axis of said tube,
(d) means including a light source for directing a beam of light toward said mirror,
(e) photocell means for detecting light reflected from said mirror,
(f) rotatable means for mounting said source and said photocell means for rotation about said axis,
(g) a drive connection leading to said rotatable means to control the position thereof relative to said axis, and
(h) an indicating circuit connected to said photocell means for developing a distinctive physical condition when said photocell means is rotated into said light.

17. A pressure sensing system which comprises:
(a) a frame,
(b) a hollow helical fused quartz tube fixedly supported at one end thereof by said frame and anchored for rotation at the other end,
(c) means to connect said tube to a source of pressure to be measured to cause rotation of said other end in proportion to the pressure differential across the walls of said tube,
(d) a mirror mounted for rotation with said other end about the axis of the helix,
(e) a collimated light source for directing a beam of light toward said mirror,
(f) a photocell array symmetrically mounted about the axis of said helix and including a pair of matched photocells for detecting light reflected from said mirror,
(g) a turntable supported by said base and rotatable about the axis of said helix for mounting said source and said photocell array,
(h) a drive connection coupled to said turntable to vary the rotational position of said source and said array relative to said mirror, and
(i) indicating means connected to said array responsive to a voltage null when said matched photocells equally receive light reflected from said mirror.

18. A pressure sensing system as set forth in claim 17, comprising a motor coupled to said drive connection to vary the rotational positon of said source in response to an electrical signal applied to said motor, and wherein said indicating means further includes a circuit for producing an electrical error signal when said matched photocells do not equally receive light reflected from said mirror.

19. A gauge for use in determination of a pressure differential which comprises a pressure capsule having a hollow transparent cylinder closed at one end, a cap for sealing the other end of said cylinder, a rigid member extending into said cylinder supported by the closed end of said cylinder, a pair of quartz fiber support rods extending from said member toward the axis of said cylinder, a hinged quartz stem extending from the support adjacent said cap toward said closed end and connected to the rod adjacent said closed end by a quartz fiber spring, a hollow quartz helical spring having a closed end fastened to said stem and being flow-connected through said closed end of said cylinder for connecting said spring to a source of pressure to be measured, means including a flow connection through said closed end of said cylinder into said cylinder exterior of said helical spring, and a mirror mounted for rotation with said stem in response to the difference between the pressures inside and outside of said spring, said gauge further comprising a light source for directing a beam of light onto said mirror, light-sensitive means, means for supporting said light-sensitive means in a position to receive light from said source reflected by said mirror, and circuit means responsive to said light-sensitive means to produce an indication of the position of the reflected light beam relative to said light-sensitive means.

20. A meter for measuring pressure which comprises:
(a) a meter housing,
(b) a socket in an upper panel thereof,
(c) a turntable mounted below said panel for rotation about an axis corresponding with the axis of said socket,
(d) an insert for said socket which includes a hollow fused quartz helical spring having a closed end and adapted to be positioned in said socket with the axis of said spring aligned with the axis of said turntable, said spring being mounted at an open end thereof as to be connected to a pressure source,
(e) a mirror mounted for rotation about said axis with said spring at said closed end,
(f) a light source mounted on said turntable and adapted to illuminate said mirror,
(g) a light-sensitive means mounted on said turntable adjacent to said light source for sensing light reflected from said mirror,
(h) metering means responsive to said light-sensitive means for providing a distinctive output representative of a predetermined distribution of light reflected from said mirror upon said light-sensitive means, and
(i) drive means for rotating said turntable to intercept light reflected from said mirror by said light-sensitive means.

21. A meter for measuring pressure which comprises:
(a) a meter housing,
(b) a socket extending through an upper panel thereof,
(c) a turntable mounted below said panel for rotation about an axis corresponding with the axis of said socket,
(d) an insert for said socket which includes a hollow fused quartz helical spring having a closed end and adapted to be positioned in said socket with the axis of said spring aligned with the axis of said turntable, said spring being rigidly mounted at an open end thereof as to be connected to a pressure source,
(e) a mirror mounted for rotation about said axis with said spring at said closed end,
(f) a light source mounted on said turntable and adapted to direct a collimated beam of light of predetermined configuration toward said mirror,
(g) a pair of like light-sensitive devices mounted on said turntable adjacent to said light source for sensing light reflected from said mirror,
(h) metering means responsive to said light-sensitive devices for providing an output representative of the division between them of light reflected from said mirror, and (i) drive means for rotating said turntable to intercept light reflected from said mirror by said light-sensitive devices.

22. A meter for measuring pressure which comprises:
(a) a meter housing,
(b) a socket extending through an upper panel thereof,
(c) a turntable mounted below said panel for rotation about an axis corresponding with the axis of said socket,
(d) an insert capsule for said socket which includes a closed transparent tube with a hollow fused quartz helical spring having a closed end positioned with said tube in said socket with the axis of said spring at the axis of said turntable, said spring being rigidly secured at one end thereof and adapted at said one end to be connected to a source of pressure to be measured,
(e) a mirror mounted for rotation about said axis with said spring at said closed end,
(f) a light source mounted on said turntable and adapted to illuminate said mirror,
(g) a photocell array including a center pair of matched photocells mounted on said turntable symmetrical to said light source for sensing light reflected from said mirror,
(h) metering means responsive to said array for producing a null output when light reflected from said mirror is equally divided between said pair of photocells, and
(i) drive means for rotating said turntable for interception of light reflected from said mirror by said array.

23. A pressure gauge which comprises:
(a) a hollow helical tube supported with one end thereof fixed and with the other end movable,
(b) a mirror mounted at the other end of said tube and at the axis thereof for rotation relative to said axis in dependence upon movement of said other end of said tube,
(c) structure for establishing a pressure differential across the walls of said tube to move said other end,
(d) a sensing system including illuminating means for directing a beam of light onto said mirror and light-sensitive means mounted in fixed relation to said illuminating means for detecting the reflected light,
(e) rotatable means for producing relative rotation of said sensing system with respect to said mirror about said axis to bring into predetermined space coincidence said light sensitive means and said reflected light, and
(f) a circuit means responsive to said light sensitive means for developing a distinctive physical condition upon occurrence of said space coincidence.

24. The pressure gauge of claim 23, wherein said rotatable means is a worm gear turntable and wherein said gauge includes a motor for driving said worm gear turntable to produce said relative rotation in response to an electrical signal applied to said motor.

25. The pressure gauge of claim 24 wherein said circuit means includes means for generating said electrical signal applied to said motor upon the non-occurrence of said space coincidence.

References Cited by the Examiner
UNITED STATES PATENTS
3,067,617  12/1962  Buck _______________ 73—411

LOUIS R. PRINCE, *Primary Examiner.*